US010174869B2

(12) United States Patent
Erickson et al.

(10) Patent No.: US 10,174,869 B2
(45) Date of Patent: Jan. 8, 2019

(54) MULTIPLE FAILURE MODE CLAMPS AND RELATED METHODS

(71) Applicant: Ameriforge Group Inc., Houston, TX (US)

(72) Inventors: Mark Erickson, Houston, TX (US); Jason Bludau, Houston, TX (US); Jack Webb, Houston, TX (US)

(73) Assignee: AMERIFORGE GROUP INC., Houston, TX (US)

( * ) Notice: Subject to any disclaimer, the term of this patent is extended or adjusted under 35 U.S.C. 154(b) by 35 days.

(21) Appl. No.: 15/327,949

(22) PCT Filed: Jun. 10, 2015

(86) PCT No.: PCT/US2015/035048
§ 371 (c)(1),
(2) Date: Jan. 20, 2017

(87) PCT Pub. No.: WO2016/014161
PCT Pub. Date: Jan. 28, 2016

(65) Prior Publication Data
US 2017/0204997 A1 Jul. 20, 2017

Related U.S. Application Data

(60) Provisional application No. 62/027,518, filed on Jul. 22, 2014.

(51) Int. Cl.
*F16L 3/00* (2006.01)
*F16L 3/237* (2006.01)
(Continued)

(52) U.S. Cl.
CPC ............ *F16L 3/237* (2013.01); *E21B 17/006* (2013.01); *E21B 17/1035* (2013.01); *F16L 3/222* (2013.01); *E21B 17/01* (2013.01)

(58) Field of Classification Search
CPC ......................................................... H02G 2/32
(Continued)

(56) References Cited

U.S. PATENT DOCUMENTS 3,893,263 A * 7/1975 Jackman ................. B24B 23/08
451/246
4,059,872 A 11/1977 Delesandri ....................... 24/284
(Continued)

FOREIGN PATENT DOCUMENTS

CN 203023642 6/2013
FR 2952620 5/2011
(Continued)

OTHER PUBLICATIONS

International Search Report and Written Opinion issued in PCT/US2015/035048, dated Aug. 26, 2015.
(Continued)

*Primary Examiner* — Steven M Marsh
(74) *Attorney, Agent, or Firm* — Norton Rose Fulbright US LLP (57) ABSTRACT

Some embodiments of the present clamps include a first clamp portion having a first end defining a recess and a second end configured to be coupled to a first structure, a second clamp portion having a first end configured to be coupled to a second structure and a second end configured to be received in the recess of the first clamp portion, and a shear pin configured to secure the second clamp portion relative to the first clamp portion. Some embodiments include a retaining member disposed in the recess. In some embodiments, the recess and/or retaining member is configured to resist shearing of the shear pin if a force is applied to the second clamp portion in a first direction, but not if the
(Continued)

force is applied in a second direction. In some embodiments, the first direction is substantially parallel with, but opposite to, the second direction.

20 Claims, 8 Drawing Sheets (51) Int. Cl.
　　　*E21B 17/10*　　　(2006.01)
　　　*E21B 17/00*　　　(2006.01)
　　　*F16L 3/22*　　　(2006.01)
　　　*E21B 17/01*　　　(2006.01)

(58) Field of Classification Search
　　　USPC .......................................... 248/61, 65, 74.1
　　　See application file for complete search history.

(56) References Cited

U.S. PATENT DOCUMENTS

| | | | |
|---|---|---|---|
| 4,249,610 A | 2/1981 | Loland | 166/360 |
| 4,360,177 A | 11/1982 | Dulhunty | 248/63 |
| 4,437,791 A | 3/1984 | Reynolds | 405/224.2 |
| 4,445,255 A | 5/1984 | Olejak | 24/284 |
| 4,492,005 A | 1/1985 | Begley et al. | 24/270 |
| 4,678,147 A | 7/1987 | Barnes et al. | 248/74.1 |
| 4,864,696 A | 9/1989 | Mittermaier et al. | 24/284 |
| 5,598,995 A | 2/1997 | Meuth et al. | 248/74.3 |
| 5,904,445 A | 5/1999 | Meuth | 405/195.1 |
| 6,262,691 B1* | 7/2001 | Austin | H01Q 1/1221 343/878 |
| 6,431,502 B1 | 8/2002 | Goodman | 248/74.1 |
| 6,625,849 B1* | 9/2003 | Womack | G02B 6/3616 24/115 M |
| 6,726,166 B2 | 4/2004 | Goodman | 248/229.14 |
| 6,832,427 B2 | 12/2004 | Meuth et al. | 29/446 |
| 7,431,535 B2 | 10/2008 | Cupolillo | 405/184.4 |
| 7,614,593 B2 | 10/2009 | McClure et al. | 248/229.14 |
| 7,685,904 B2* | 3/2010 | Cutsforth | B62K 21/16 74/551.3 |
| 7,861,982 B1 | 1/2011 | McClure | 248/74.1 |
| 7,988,104 B1 | 8/2011 | Cook et al. | 248/68.1 |
| 7,992,829 B1* | 8/2011 | Baker | F16L 3/24 248/62 |
| 8,038,126 B1 | 10/2011 | Albritton | 256/13.1 |
| 8,464,986 B1 | 6/2013 | McClure | 248/74.1 |
| 2002/0070317 A1 | 6/2002 | Goodman | 248/74.1 |
| 2005/0242253 A1 | 11/2005 | McClure et al. | 248/230.5 |
| 2007/0231074 A1 | 10/2007 | Cupolillo | 405/184.4 |
| 2008/0283687 A1 | 11/2008 | McClure et al. | 248/74.1 |
| 2011/0042095 A1 | 2/2011 | Sessions et al. | 166/360 |
| 2011/0154620 A1 | 6/2011 | Whitelaw et al. | 24/122.6 |
| 2011/0186693 A1 | 8/2011 | McMiles et al. | 248/65 |

FOREIGN PATENT DOCUMENTS

| | | |
|---|---|---|
| FR | 2994620 | 2/2014 |
| WO | WO 93/20327 | 10/1993 |
| WO | WO 01/69117 | 9/2001 |
| WO | WO 2008/152372 | 12/2008 |

OTHER PUBLICATIONS

International Preliminary Report on Patentability issued in Application No. PCT/US2015/035048, dated Feb. 2, 2017.
Extended European Search Report issued in European Patent Application No. 15824981, dated Feb. 23, 2018.

* cited by examiner

MULTIPLE FAILURE MODE CLAMPS AND RELATED METHODS

BACKGROUND

This application is a national phase application under 35 U.S.C. § 371 of International Application No. PCT/US2015/035048, filed Jun. 10, 2015, which claims the benefit of priority to U.S. Provisional Patent Application Ser. No. 62/027,518, filed Jul. 22, 2014, the entire contents of each of which applications are hereby incorporated by reference in their entirety.

1. Field of Invention

The present invention relates generally to clamps, and more specifically, but not by way of limitation, to clamps with multiple failure modes configured to, for example, couple an umbilical line to a drilling riser.

2. Description of Related Art

Clamps are frequently used in the drilling industry, for example, to couple an umbilical to a drilling riser.

Risers are conduits used in offshore drilling operations that can transport materials (e.g., injection fluids, drilling mud, hydrocarbons, and/or the like) between a subsea well and a surface facility. Generally, umbilicals are used to connect a surface facility to a well-head (or associated components) to allow communication of electricity, hydraulic fluid, chemicals, choke/kill fluid, signals, and/or the like between the surface facility and the well. Typically, an umbilical is run alongside and is coupled to the drilling riser through the use of clamps.

A typical riser/umbilical system can experience various loads due to, for example, tension in the umbilical and/or riser, umbilical and/or riser weight, ocean currents, internal and/or external fluid pressures, and/or the like. These loads may be transmitted to the umbilical (e.g., through the clamps), which, in some instances, may result in damage to the umbilical. Damaged umbilicals can be costly and/or time consuming to repair or replace.

Examples of clamps are disclosed in U.S. Patents: (1) U.S. Pat. No. 6,431,502; (2) U.S. Pat. No. 6,726,166; (3) U.S. Pat. No. 4,360,177; and (4) U.S. Pat. No. 6,832,427. An additional example of a clamp is disclosed in French Patent No. 2 952 620.

SUMMARY

Some embodiments of the present clamps are configured, through a first clamp portion coupled to an asymmetric portion of a second clamp portion by a shear pin, to resist shearing of the shear pin if a force is applied to the second clamp portion in a first direction (e.g., a first failure mode) and not resist shearing of the shear pin if a force is applied to the second clamp portion in a second direction (e.g., a second failure mode). Some embodiments are configured, through configuration of the recess of the first clamp portion and/or an optional retaining member, such that the shear pin will shear if a first load that exceeds a first threshold is applied to the second clamp portion in the first direction, or if a second load that exceeds a second threshold is applied to the second clamp portion in the second direction.

Some embodiments of the present clamps comprise: a first clamp portion having a first end defining a recess and a second end configured to be coupled to a riser; a second clamp portion having a first end configured to be coupled to an umbilical and a second end configured to be received in the recess of the first clamp portion; and a shear pin configured to be coupled to the first clamp portion such that the shear pin extends into the recess and the second clamp portion to couple the second clamp portion to the first clamp portion; where the clamp is configured such that the shear pin will shear if: a first load that exceeds a first threshold is applied to the second clamp portion in a first direction; or a second load that exceeds a second threshold is applied to the second clamp portion in a second direction; where the first threshold is greater than the second threshold. In some embodiments, the first threshold is between 1.1 and 1.8 times the second threshold. Some embodiments further comprise: a retaining member configured to be coupled to the first clamp portion such that the retaining member extends into the recess to resist shearing of the shear pin upon application of the first load.

Some embodiments of the present clamps comprise: a first clamp portion having a first end defining a recess and a second end configured to be coupled to a first structure; a second clamp portion having a first end configured to be coupled to a second structure and a second end configured to be received in the recess of the first clamp portion; a shear pin configured to be coupled to the first clamp portion such that the shear pin extends into the recess and the second clamp portion to couple the second clamp portion to the first clamp portion; and a retaining member configured to be coupled to the first clamp member such that the retaining member extends into the recess to: resist shearing of the shear pin if a force is applied to the second clamp portion in a first direction; and not resist shearing of the shear pin if a force is applied to the second clamp portion in a second direction. In some embodiments, the first structure comprises a riser. In some embodiments, the second structure comprises an umbilical line. In some embodiments, the clamp is configured such that the shear pin will shear if: a first load that exceeds a first threshold is applied to the second clamp portion in the first direction; or a second load that exceeds a second threshold is applied to the second clamp portion in the second direction. In some embodiments, the first threshold is between 1.1 times and 1.8 times the second threshold.

In some embodiments of the present clamps, the second end of the second clamp portion comprises a bearing surface configured to contact the retaining member. In some embodiments, the second end of the second clamp portion comprises a protrusion configured to extend between the retaining member and at least one sidewall of the first clamp portion. In some embodiments, the second end of the second clamp portion defines a notch or recess configured to be longitudinally spaced from the retaining member when the second clamp portion is received by the first clamp portion. In some embodiments, the retaining member is cylindrical. In some embodiments, the retaining member comprises titanium. In some embodiments, the retaining member is unitary with the first clamp portion. In some embodiments, the retaining member is configured to extend across the recess. In some embodiments, the clamp is configured such that the retaining member is spaced from the shear pin in the second direction.

In some embodiments of the present clamps, the clamp is configured such that the shear pin is disposed longitudinally between the first end of the first clamp portion and the retaining member. In some embodiments, the clamp is configured such that a longitudinal distance from the first end of the first clamp portion to the center of the retaining member is between 2 to 4 times a longitudinal distance from the first end of the first clamp portion to the center of the shear pin. In some embodiments, the shear pin has a transverse dimension that is smaller than a transverse dimension of the retaining member. In some embodiments, the shear pin has a cross-sectional area smaller than a cross-sectional area of the retaining member. In some embodiments, the shear pin is cylindrical. In some embodiments, the shear pin comprises titanium. In some embodiments, the shear pin is configured to extend across the recess.

In some embodiments of the present clamps, the first direction is substantially parallel with and substantially opposite to the second direction. In some embodiments, at least one of the first and second directions is substantially perpendicular to a longitudinal axis of the first clamp portion. In some embodiments of the present clamps, at least one sidewall of the first clamp portion defines an opening in direct communication with the recess. In some embodiments, the opening is configured such that at least a portion of the second clamp portion can pass from the recess and through the opening if the shear pin shears in the second direction. In some embodiments, at least one sidewall of the first clamp portion is configured to apply a resistive force to the second clamp portion at a point longitudinally between the first end of the second clamp portion and the shear pin if a force is applied to the second clamp portion in a first direction. In some embodiments, at least one sidewall of the first clamp portion is configured to apply a resistive force to the second clamp portion at a point longitudinally between the second end of the first clamp portion and the shear pin if a force is applied to the second clamp portion in a second direction. In some embodiments, a longitudinal distance from the second end of the second clamp portion to the center of the shear pin is between 1 to 4 times a longitudinal distance from the first end of the first clamp portion to the center of the shear pin. In some embodiments, the second clamp portion comprises a flange configured to contact the first end of the first clamp portion. In some embodiments, an outer surface of the first end of the first clamp portion is chamfered. In some embodiments, an outer surface of the second end of the second clamp portion is chamfered.

Some embodiments of the present methods comprise: coupling, with a shear pin, a second clamp portion into a recess of a first clamp portion having a retaining member such that: the retaining member resists shearing of the shear pin if a force is applied to the second clamp portion in a first direction and does not resist shearing of the shear pin if a force is applied to the second clamp portion in a second direction.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, 10, and 20 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION OF ILLUSTRATIVE EMBODIMENTS

Referring now to the drawings, and more particularly to FIGS. 1A-1D, shown therein and designated by the reference numeral 10 is one embodiment of the present clamps.

Clamp 10 comprises a first clamp portion 14 having a first end 18 defining a recess 22 and a second end 26 configured to be coupled to a first structure (e.g., a riser). For example, in this embodiment, second end 26 of first clamp portion 14 defines a t-shaped member 30, which is configured to be received within a recess or slot 34 (e.g., and secured against inadvertent separation from the recess or slot via a pin 40) of a flange 38, which can be coupled to the first structure (e.g., riser), for example, via one or more U-bolt assemblies 42. In other embodiments, second end 26 can be configured to be coupled to the first structure through any suitable structure, such as, for example, fasteners, such as rivets, screws, nuts, bolts, and/or the like, welding, and/or the like, and such coupling can be indirect, direct (e.g., without flange 38 and/or U-bolt assemblies 42), or second end 26 can be unitary with the first structure (e.g., forming part of a riser).

In the embodiment shown, clamp 10 comprises a second clamp portion 46 (described in more detail below) having a first end 50 configured to be coupled to a second structure (e.g., an umbilical, for example, a cable, tube, pipe, conduit, line and/or the like, which can be configured to transport electricity, hydraulic fluid, chemicals, choke/kill fluid, signals, and/or the like). In this embodiment, second clamp portion 46 comprises a second end 52 configured to be received within recess 22 of first clamp portion 14.

In the embodiment shown, first end 50 of second clamp portion 46 is coupled to, or is unitary with at least a portion of, a cable clamp 54. By way of example, in the depicted embodiment, cable clamp 54 includes a first or lower clamping member 58 pivotally connected (e.g., via a pin 62) to a second or upper clamping member 66. In this embodiment, first clamping member 58 and second clamping member 66 are movable relative to one another between an opened position and a closed position (e.g., as shown), in which the clamping members cooperate to define one or more channels 70, which are suitable for receiving the second structure (e.g., one or more umbilicals).

In the embodiment shown, cable clamp 54 comprises a compression assembly 74, which includes a bolt 78 configured to be received through a pin 82 and into a nut 90, whereby the bolt can be tightened relative to the nut to secure the first and second clamping members in the closed position. In clamp 10, pin 82 is rotatably coupled to first clamping member 58, and bolt 78 is configured to be received within an opening or slot 86 defined through a side 88 of second clamping member 66. In this way, for example, through pivotal movement of pin 82 relative to first clamping member 58 and/or through configuration of opening or slot 86, bolt 78 can apply compression to the closed first and second clamping members without subjecting the bolt to substantial bending loads.

FIGS. 2A-2D depict various views of first clamp portion 14 of clamp 10. In the embodiment shown, first clamp portion 14 defines one or more holes or openings 98a, 98b, each in communication with recess 22 and each sized to receive a corresponding shear pin 102 or retaining member 106 (described in more detail below). In the embodiment shown, each opening 98a, 98b extends from recess 22 and through first clamp portion 14 (e.g., openings 98a, 98b are through holes), however, in other embodiments, the one or more holes or openings can be defined by first clamp portion 14 (e.g., within recess 22), but not extend through all of the first clamp portion (e.g., openings 98a, 98b can be blind holes). In the embodiment shown, at least one sidewall 110 of first clamp portion 14 defines an opening 114 in direct communication with recess 22 and that extends through first end 18 (e.g., as shown, such that first end 18 of first clamp portion 14 is generally U-shaped).

In the embodiment shown, first clamp portion 14 defines a notch or slot 118 adjacent t-shaped member 30 and between the t-shaped member and first end 18, which can be configured to cooperate with recess or slot 34 of flange 38 (e.g., to locate first clamp portion 14 relative to flange 38) (e.g., as shown in FIG. 1 D). In the embodiment shown, the outer surfaces of first end 18 are chamfered, such as, for example, to facilitate reception of second clamp portion 46.

Figure 4A:
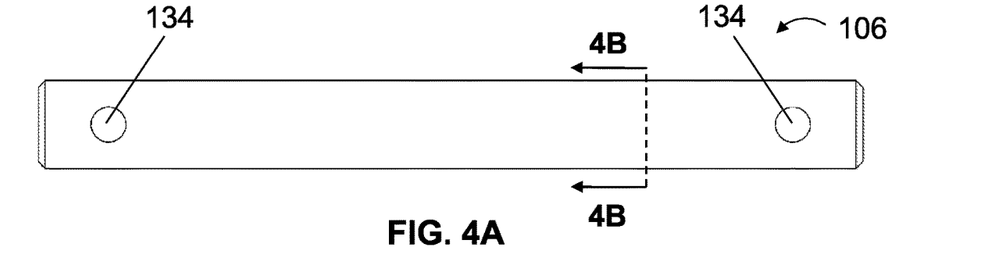
FIGS. 4A and 4B are front and cross-sectional side views, respectively, of a retaining member of the clamp of FIG. 1A.
Figure 4B:
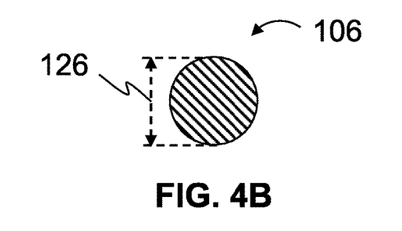

Referring now to FIGS. 3A-4B, FIGS. 3A and 3B depict front and cross-sectional side views, respectfully, of an example of a shear pin 102, and FIGS. 4A and 4B depict front and cross-sectional side views, respectfully, of an example of a retaining member 106. In the embodiment shown, shear pin 102 and retaining member 106 are each substantially cylindrical, and each has a transverse dimension (e.g., diameter) 122 or 126, respectively. In this embodiment, transverse dimension 122 of shear pin 102 is smaller than transverse dimension 126 of retaining member 106 (e.g., and shear pin 102 has a cross-sectional area smaller than a cross-sectional area of retaining member 106). In this way, given a same or similar material composition of the shear pin and retaining member, the shear pin can have a lower stiffness than the retaining member. For example, in this embodiment, shear pin 102 and retaining member 106 each comprise titanium. However, in other embodiments, the shear pin and retaining member can comprise any suitable material, such as, for example, aluminum, steel, iron, composites, and/or the like, and shear pin 102 need not comprise the same material as retaining member 106. In these and other embodiments, shear pin(s) and retaining member(s) can comprise any suitable size or shape (relative to one another or otherwise), and the shear pin need not always have a smaller transverse dimension or cross-sectional area than the retaining member. In the embodiment shown, both shear pin 102 and retaining member 106 define one or more transverse openings 130 or 134, respectively, which can be configured, for example, to receive a securing device (e.g., a cotter pin, safety wire, fastener, and/or the like) to retain the shear pin and/or retaining member relative to other components of clamp 10 (e.g., first clamp portion 14 and/or second clamp portion 46).

In the embodiment shown, shear pin 102 and retaining member 106 are each configured (e.g., sized) to extend across recess 22 of the first clamp portion and into and/or through the respective openings 98a or 98b (in this embodiment, openings 98a are configured to receive shear pin 102, and openings 98b are configured to receive retaining member 106). However, in other embodiments, shear pin 102 and/or retaining member 106 can be configured to extend into, but not completely across, recess 22. In other embodiments, shear pin 102 and/or retaining member 106 can be unitary with the first clamp portion and/or recess 22. In these and other embodiments, recess 22 can be configured to perform the function of retaining member 106, and, in some of these embodiments, retaining member 106 can be omitted (described in more detail below).

Figure 5A:
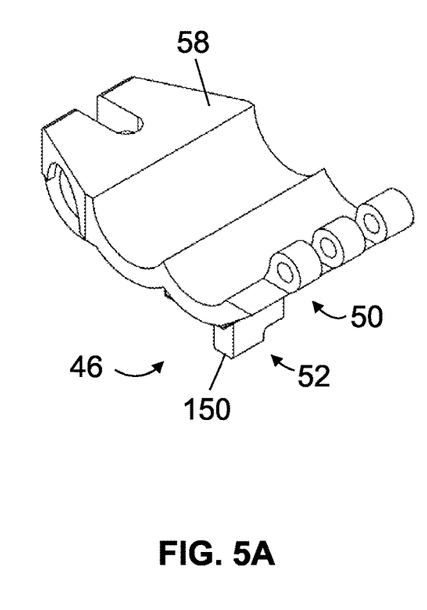
FIG. 5A is a perspective view of a second clamp portion of the clamp of FIG. 1A.
Figure 5B:
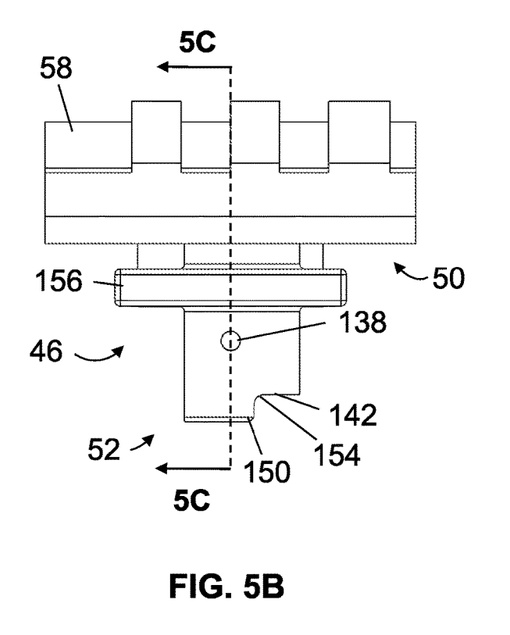
FIGS. 5B and 5C are side and cross-sectional front views of the second clamp portion of FIG. 5A.
Figure 5C:
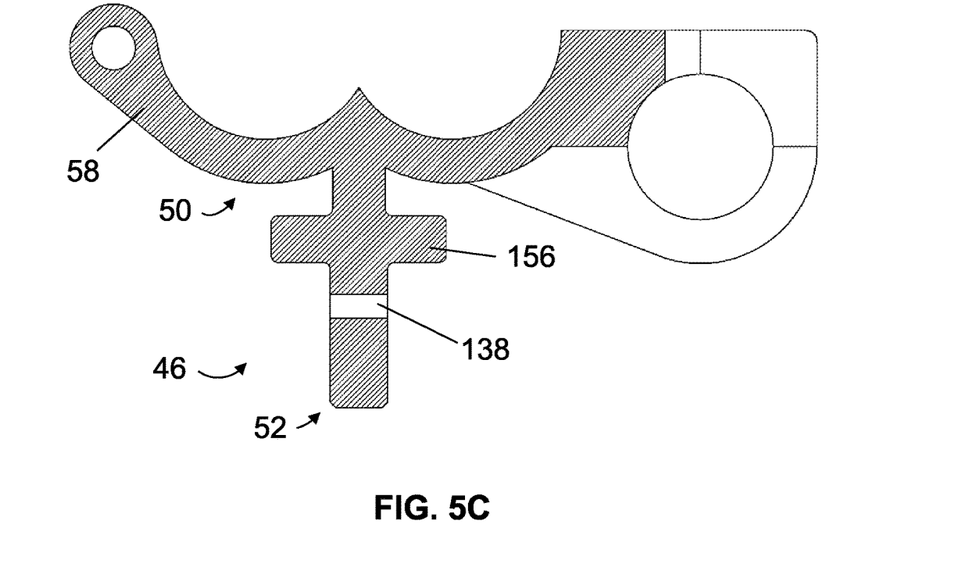

FIGS. 5A-5C depict various views of second clamp portion 46 of clamp 10. As described above, in this embodiment, second clamp portion 46 is unitary with at least a portion of cable clamp 54 (e.g., first clamping member 58). In the embodiment shown, second clamp portion 46 defines one or more holes or openings 138, which can be configured to receive a shear pin 102 or a retaining member 106. For example, second clamp portion 46 can be received by recess 22 of first clamp portion 14, a shear pin (e.g., 102) can be disposed within and/or through openings 98a of first clamp portion 14, and through a hole or opening 138 of second clamp portion 46, thereby coupling the second clamp portion relative to the first clamp portion.

Figure 1A:
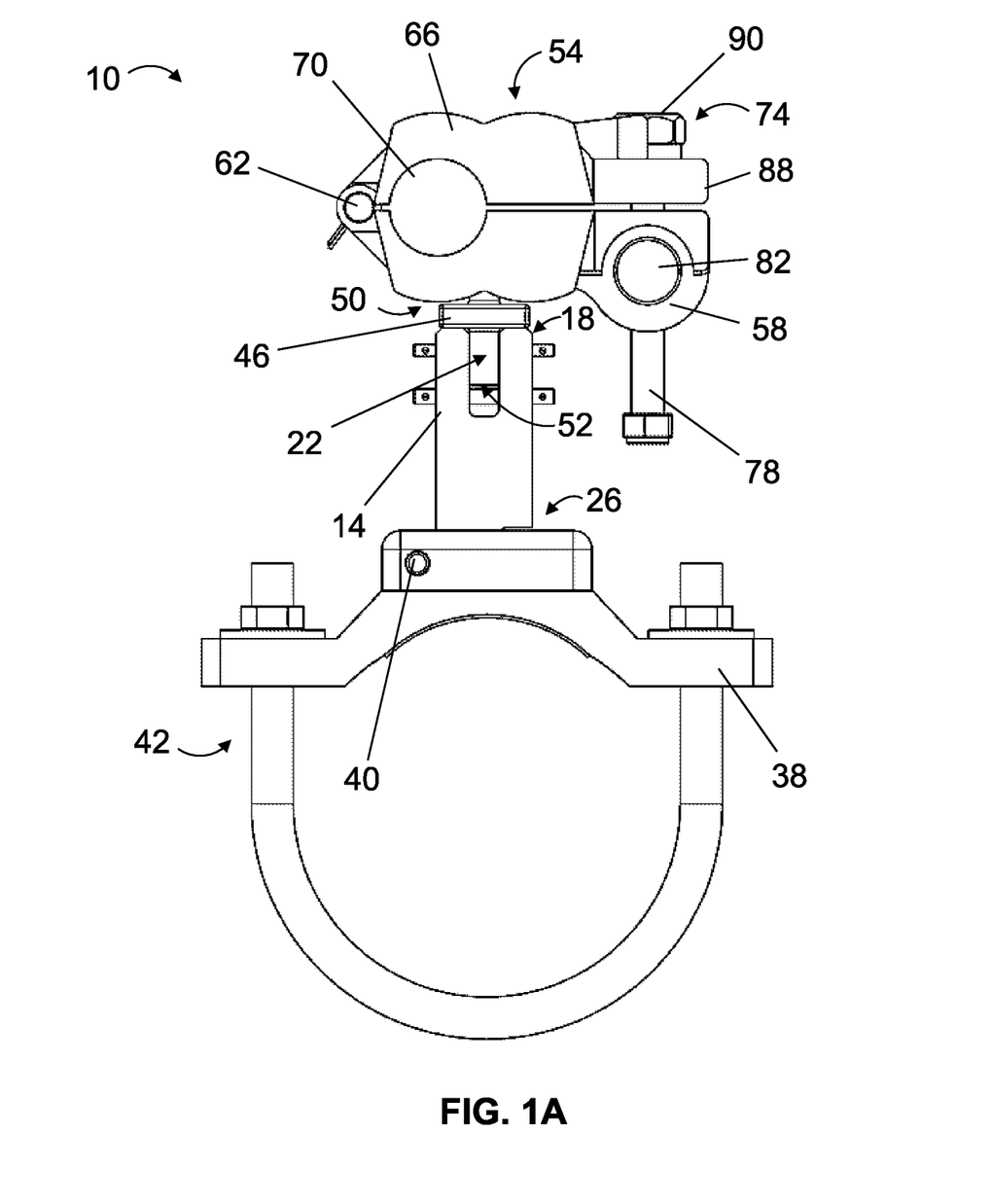
FIG. 1A is a front view of one embodiment of the present clamps.
Figure 1B:
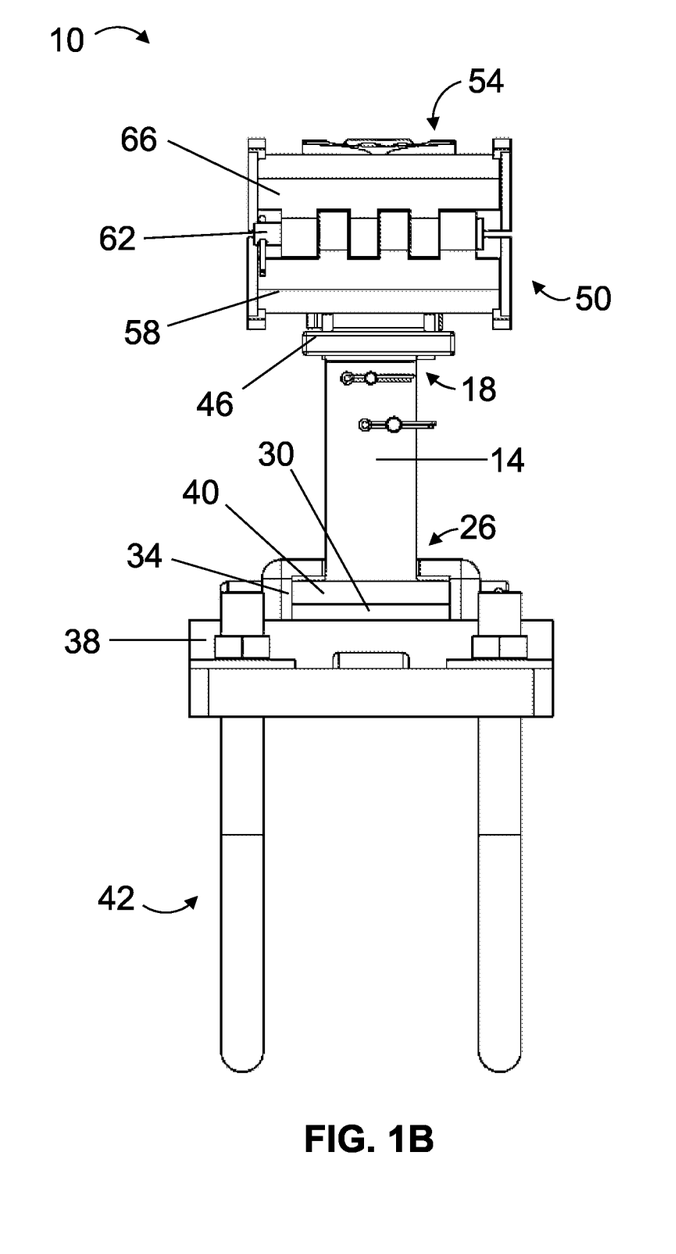
FIGS. 1B and 1C are side and top views, respectively, of the clamp of FIG. 1A.
Figure 1C:
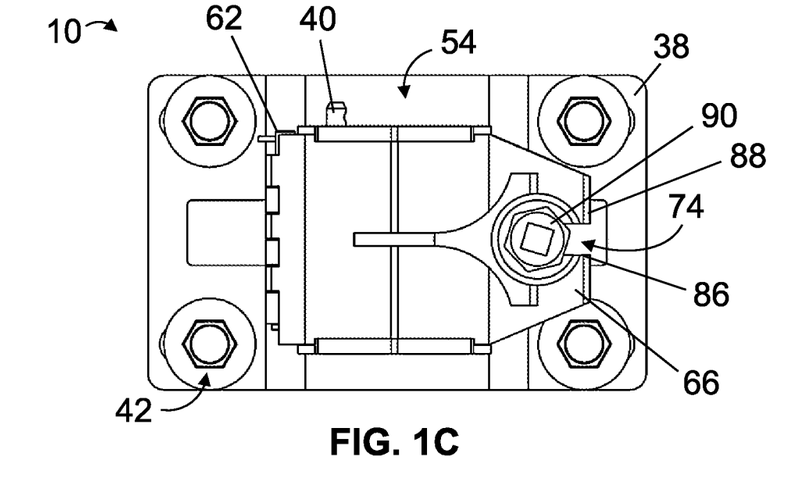
Figure 1D:
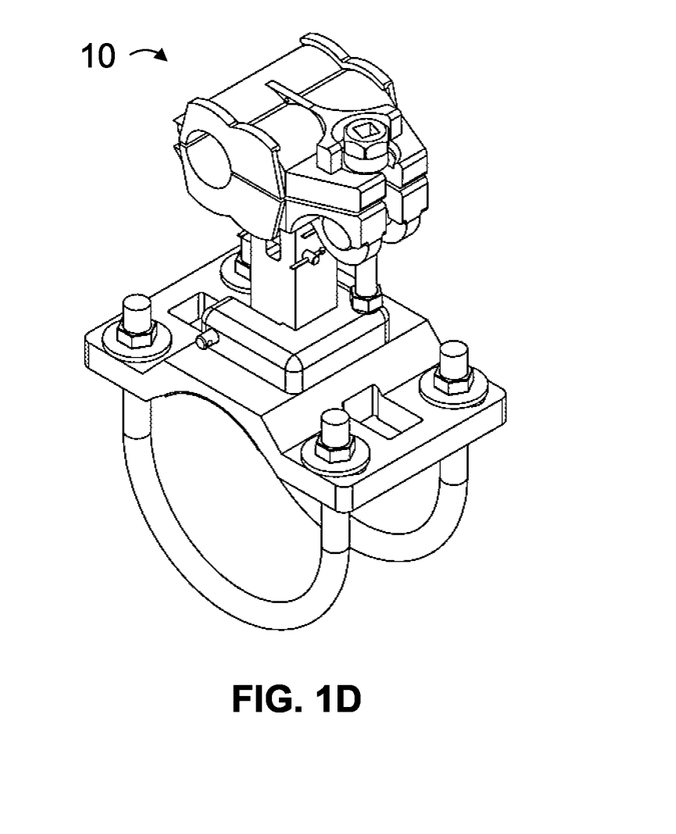
FIG. 1D is a perspective view of the clamp of FIG. 1A.
Figure 2A:
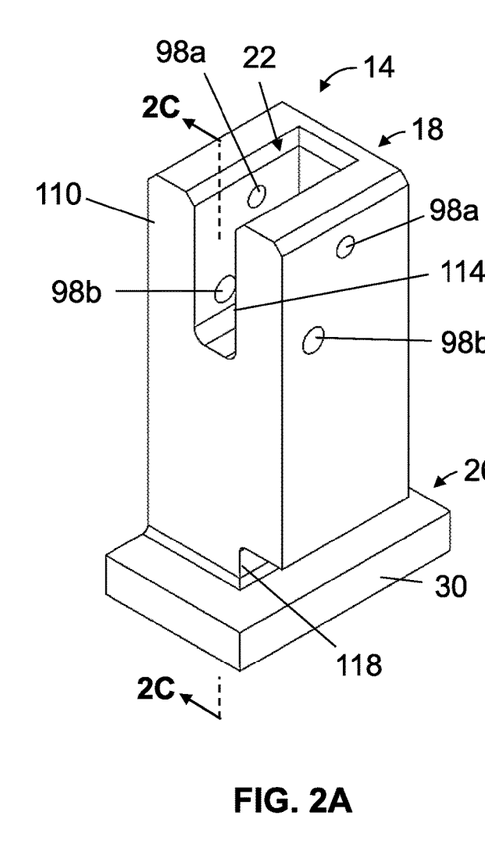
FIG. 2A is a perspective view of a first clamp portion of the clamp of FIG. 1A.
Figure 2B:
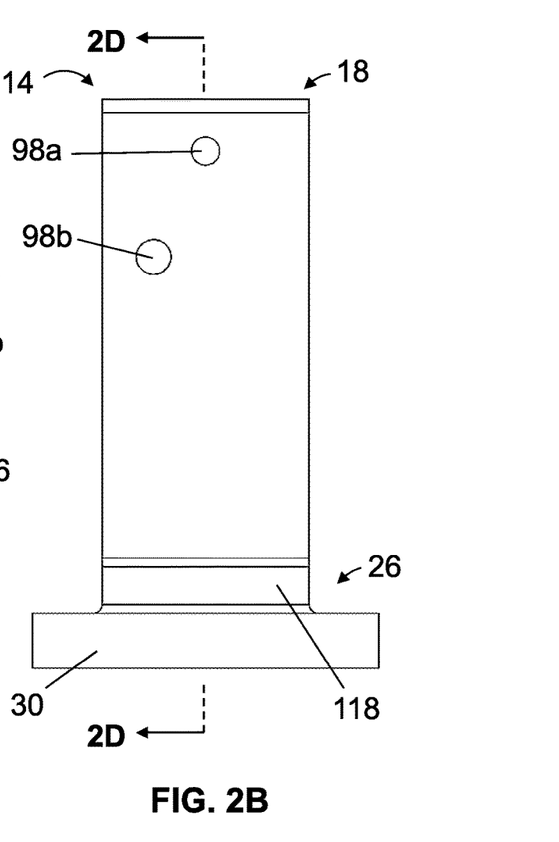
FIG. 2B is a side view of the first clamp portion of FIG. 2A.
Figure 2C:
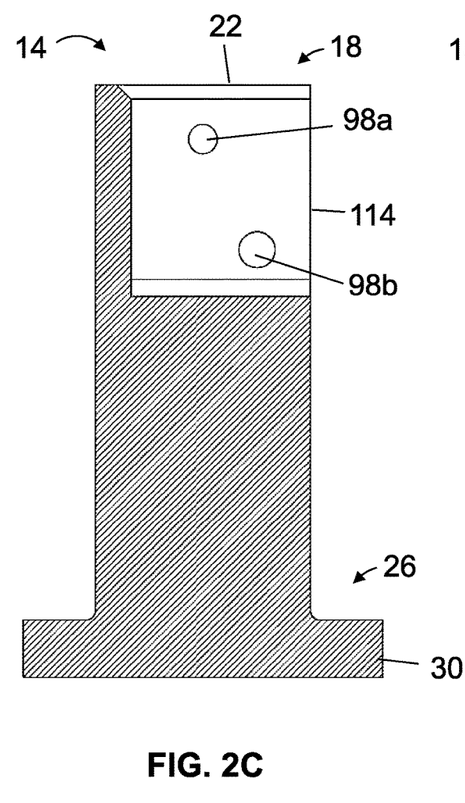
FIG. 2C is a cross-sectional side view of the first clamp portion taken along the line 2C-2C of FIG. 2A.
Figure 2D:
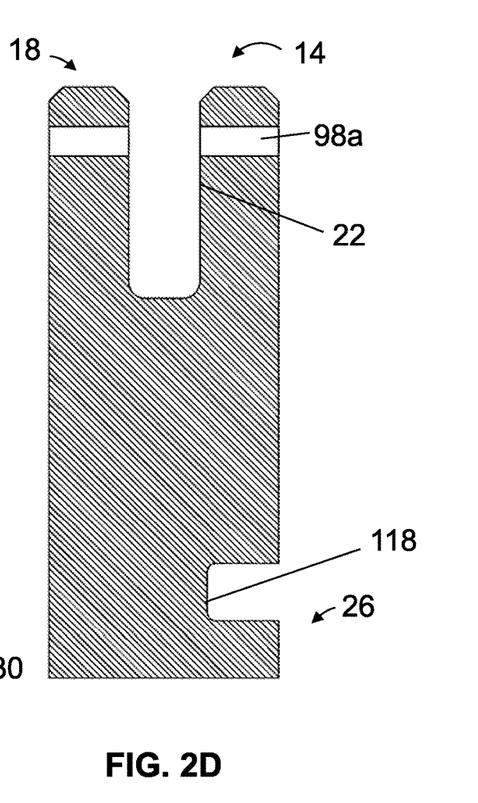
FIG. 2D is a cross-sectional front view of the first clamp portion taken along the line 2D-2D of FIG. 2B.
Figure 3A:
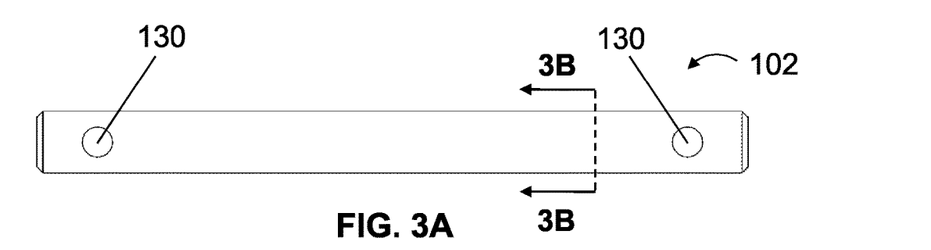
FIGS. 3A and 3B are front and cross-sectional side views, respectively, of a shear pin of the clamp of FIG. 1A.
Figure 3B:
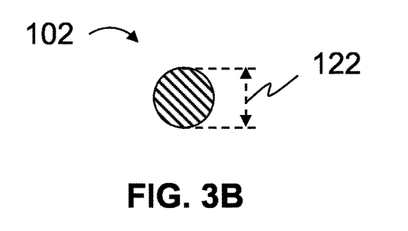

In the embodiment shown, second end 52 of second clamp portion 46 defines a notch or recess 142 (e.g., which can cooperate with the second end to define a protrusion 150). In this embodiment, notch or recess 142 is bounded by a bearing surface 154, which can be configured, for example, to contact retaining member 106 (described in more detail below). In the embodiment shown, the outer surfaces of second end 52 are also chamfered, for example, to facilitate reception of second clamp portion 46 within first clamp portion 14. In this embodiment, second clamp portion 46 comprises a flange 156 configured to contact first end 18 of first clamp portion 14 when second end 52 of second clamp portion 46 is received by recess 22 of the first clamp portion (e.g., as shown in FIG. 1A).

Figure 6:
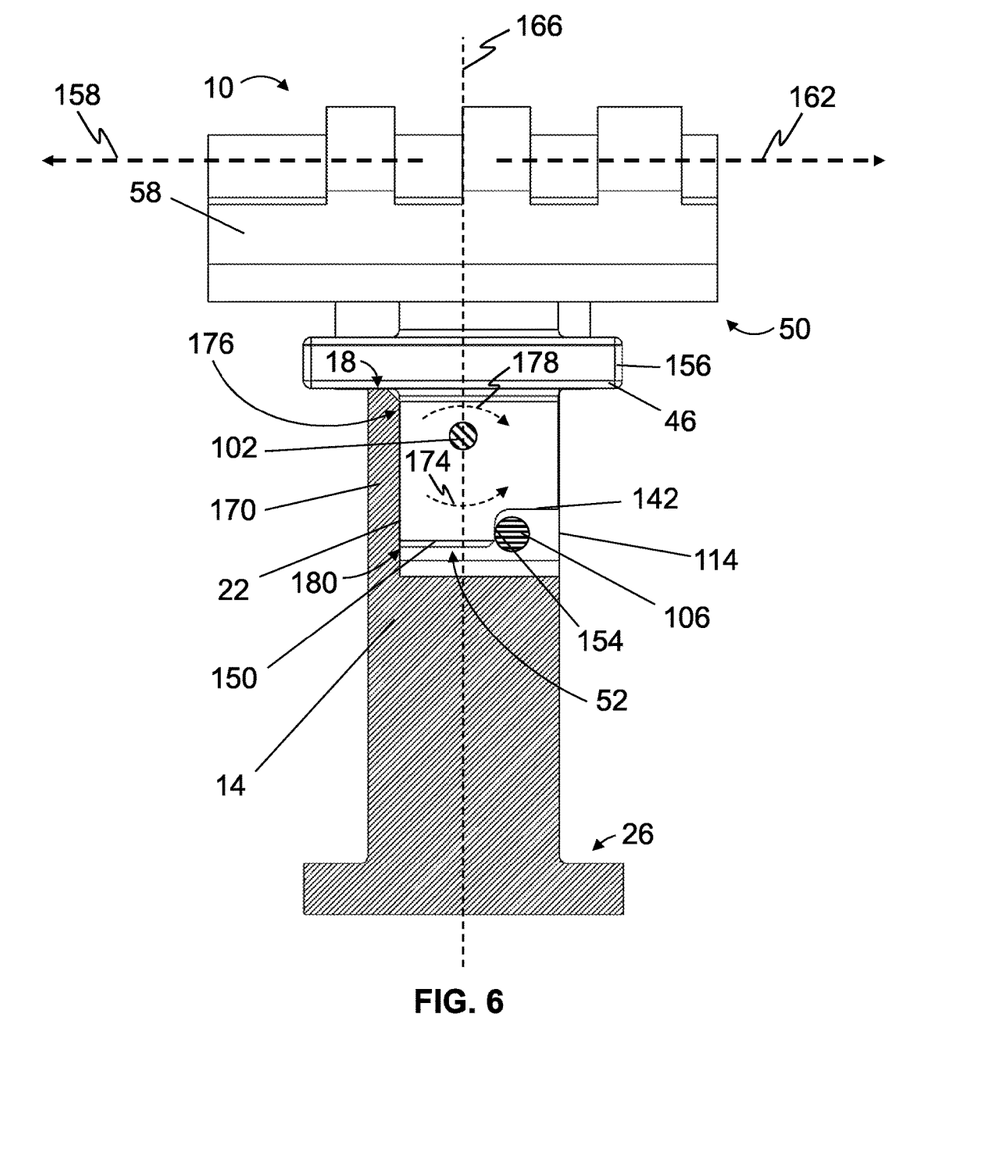
FIG. 6 is a partially cross-sectional side view of the second clamp portion of FIG. 5A coupled to the first clamp portion of FIG. 2A.

FIG. 6 depicts a partially cross-sectional side view of first clamp portion 14 coupled to second clamp portion 46. In the embodiment shown, shear pin 102 extends across the entirety of recess 22, through second clamp portion 46, and into openings 98a of first clamp portion 14 to couple the second clamp portion to first clamp portion 14 (e.g., as described above).

Clamp 10 is configured (e.g., by the shapes of recess 22, and/or the size and/or strength of shear pin 102 and/or retaining member 106) such that shear pin 102 will shear (e.g., to release and decouple second clamp portion 46 from first clamp portion 14) if a first load that exceeds a first threshold is applied to second clamp portion 46 in first direction 158 (e.g., a first failure mode), or shear pin 102 will shear if a second load that exceeds a second threshold is applied to the second clamp portion in second direction 162 (e.g., a second failure mode). In this way, clamp 10 can be configured to sustain a higher loading in direction 158 (e.g., to account for tension due to umbilical weight) than in direction 162 (which may, in at least some applications, be oriented upwardly toward the surface of a body of water in which the clamp is deployed).

In at least some embodiments, after an event in which shear pin 102 shears to release the second clamp portion from the first portion, a new shear pin 102 can be reinserted to recouple the second clamp portion to the first clamp portion such that clamp 10 is reusable.

In the embodiment shown, first direction 158 is substantially parallel with and opposite to second direction 162. In this embodiment, first direction 158 and second direction 162 each is also substantially perpendicular to longitudinal axis 166 of first clamp portion 14. In other embodiments, the orientations of first and second directions 158 and 162 may be varied relative to one another and/or relative to longitudinal axis 166. As used herein, a "longitudinal" direction generally extends between first end 18 and second end 26 of first clamp portion 14, and/or between first end 50 and second end 52 of second clamp portion 46, such as, for example, along longitudinal axis 166. As used herein, a "lateral" direction generally extends at a non-parallel angle to a longitudinal direction (e.g., perpendicular to longitudinal axis 166).

Through configuration, material properties, geometry, and/or the like of recess 22, retaining member 106, shear pin 102, and/or the like, the first and second thresholds can be varied. In this embodiment, the first threshold is greater than any one of or between any two of 1, 1.1, 1.2, 1.3, 1.4, 1.5, 1.6, 1.7, 1.8, 1.9, 2.0, 2.5, 3, or 5 (e.g., 1.1 to 1.8) times the second threshold. For example, during testing of clamp 10, shear pin 102 sheared when a load of approximately 3,200 pounds (lbf) was applied to the upper clamp portion along direction 162, and both the shear pin 102 and retaining member 106 remained intact when a load exceeding 5,400 lbf was applied to the upper clamp portion along direction 158.

As noted above, recess 22 can be configured to function similarly to retaining member 106, such as, for example, to supplement retaining member 106. In the embodiment shown, for example, recess 22 is partially defined by a sidewall 170 (e.g., without an opening) that is configured to resist shearing of the shear pin under a load applied to second clamp member 46 in first direction 158. In contrast, in the embodiment shown, opening 114 is configured such that at least a portion of second clamp portion 46 can exit recess 22 through opening 114 (e.g., if shear pin 102 shears under a load applied to the second clamp member in second direction 162) and first clamp portion 14 does not resist shearing of the shear pin in the direction of opening 114. In other embodiments, retaining member 106 may be unitary with second clamp portion 46.

In the depicted embodiment, shear pin 102 is spaced longitudinally (e.g., vertically, along longitudinal axis 166, as shown) below first end 18 of first clamp portion 14 and longitudinally above retaining member 106 (e.g., shear pin 102 is longitudinally spaced between first end 18 and retaining member 106). For example, in this embodiment, clamp 10 is configured such that the longitudinal distance between first end 18 of first clamp portion 14 to the center of retaining member 106 is between 2 and 4 times (e.g., between 2.5 and 3.5 times) a longitudinal (e.g., vertical) distance between the first end of the first clamp portion to the center of shear pin 102. In this embodiment, clamp 10 is configured such that retaining member 106 is also spaced from shear pin 102 in second direction 162 (e.g., in a lateral direction). In the embodiment shown, a longitudinal (e.g., vertical) distance from second end 52 of second clamp portion 46 to the center of shear pin 102 is between 1 and 4 times (e.g., between 2 and 3 times) a longitudinal (e.g., vertical) distance between first end 18 of the first clamp portion to the center of the shear pin. In the depicted embodiment, second end 52 of second clamp portion 46 (e.g., protrusion 150) has a width that is substantially equal to the distance between sidewall 170 and retaining member 106, and the horizontal portion of lower end 52 defining notch 142 is longitudinally (e.g., vertically) spaced above retaining member 106.

The following description of the function of clamp 10 is provided by way of example and further illustration, not by way of limitation. In the embodiment shown, retaining member 106 is disposed in recess 22 and is configured to resist shearing of shear pin 102 if a force is applied to the second clamp portion in first direction 158 (e.g., a first failure mode). For example, if a force is applied to second clamp portion 46 (e.g., via clamping member 58 and/or cable clamp 54 coupled to the second clamp portion) in first direction 158, the force and resulting torque (e.g., around shear pin 102 along direction 174) are resisted by shear pin 102, retaining member 106, and the upper portion of sidewall 170. For example, protrusion 150 of second clamp portion 46 is configured to contact retaining member 106 (e.g., protrusion 150 extends between retaining member 106 and sidewall 170), as shown. As such, when a load is applied in first direction 158, the shear pin 102 is effectively supplemented by retaining member 106 and sidewall 170

(e.g., through reactive forces applied at a points 154 and 176), thus reducing the total shear force applied to shear pin 102.

In the embodiment shown, however, neither retaining member 106 nor sidewall 170 is configured to resist shearing of shear pin 102 if a force is applied to the second clamp portion in a second direction 162. For example, if a force is applied to second clamp portion 46 in second direction 162, the resulting torque (e.g., around shear pin 102 along direction 178) may be resisted by a lower portion of sidewall 170 contacting protrusion 150 (e.g., through a reactive force at a point 180), but shear pin 102 alone must resist the vast majority of the vector force applied in direction 162 (e.g., because the torque in direction 178 will force protrusion 150 away from retaining member 106 and thereby reduce and/or eliminate any support that might otherwise be offered by retaining member 106).

Some embodiments of the present methods comprise coupling, with a shear pin (e.g., 102), a first clamp portion (e.g., 14) into a recess (e.g., 22) of a second clamp portion (e.g., 46) having a retaining member (e.g., 106) such that the retaining member (e.g., 106) resists shearing of the shear pin if a force is applied to the second clamp portion along a first direction (e.g., 158) and does not resist shearing of the shear pin if a force is applied to the second clamp portion along a second direction (e.g., 162).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A clamp comprising:
    a first clamp portion having a first end defining a recess and a second end configured to be coupled to a riser;
    a second clamp portion having a first end configured to be coupled to an umbilical and a second end configured to be received in the recess of the first clamp portion; and
    a shear pin configured to be coupled to the first clamp portion such that the shear pin extends into the recess and the second clamp portion to couple the second clamp portion to the first clamp portion;
    where the clamp is configured such that the shear pin will shear if:
        a first load that exceeds a first threshold is applied to the second clamp portion in a first direction; or
        a second load that exceeds a second threshold is applied to the second clamp portion in a second direction;
        where the first threshold is greater than the second threshold; and
        where, the second clamp portion is coupled to the umbilical, the first direction aligns with a first portion of the umbilical on a first side of the first end of the second clamp portion, and the second direction aligns with a second portion of the umbilical on a second side of the first end of the second clamp portion.

2. The clamp of claim 1, where the first threshold is between 1.1 and 1.8 times the second threshold.

3. The clamp of claim 1, further comprising a retaining member configured to be coupled to the first clamp portion such that the retaining member extends into the recess to resist shearing of the shear pin upon application of the first load.

4. A clamp comprising:
    a first clamp portion having a first end defining a recess and a second end configured to be coupled to a first structure;
    a second clamp portion having a first end configured to be coupled to a second structure and a second end configured to be received in the recess of the first clamp portion;
    a shear pin configured to be coupled to the first clamp portion such that the shear pin extends into the recess and the second clamp portion to couple the second clamp portion to the first clamp portion; and
    a retaining member configured to be coupled to the first clamp member such that the retaining member extends into the recess to:
        resist shearing of the shear pin if a force is applied to the second clamp portion in a first direction; and
        not resist shearing of the shear pin if a force is applied to the second clamp portion in a second direction;
    where, the second clamp portion is coupled to the second structure, the first direction aligns with a first portion of the second structure on a first side of the first end of the second clamp portion, and the second direction aligns with a second portion of the second structure on a second side of the first end of the second clamp portion.

5. The clamp of claim 4, where the first structure comprises a riser.

6. The clamp of claim 4, where the second structure comprises an umbilical line.

7. The clamp of claims 4, where the clamp is configured such that the shear pin will shear if:
    a first load that exceeds a first threshold is applied to the second clamp portion in the first direction; or
    a second load that exceeds a second threshold is applied to the second clamp portion in the second direction.

8. The clamp of claim 7, where the first threshold is between 1.1 times and 1.8 times the second threshold.

9. The clamp of claims 3, where the second end of the second clamp portion comprises a bearing surface configured to contact the retaining member.

10. The clamp of any of claims 3, where the second end of the second clamp portion comprises a protrusion configured to extend between the retaining member and at least one sidewall of the first clamp portion.

11. The clamp of claims 3, where the second end of the second clamp portion defines a notch or recess configured to be longitudinally spaced from the retaining member when the second clamp portion is received by the first clamp portion.

12. The clamp of claims 3, where the retaining member is unitary with the first clamp portion.

13. The clamp of claims 3, where the retaining member is configured to extend across the recess.

14. The clamp of claims 3, where the clamp is configured such that the retaining member is spaced from the shear pin in the second direction.

15. The clamp of claims 3, where the clamp is configured such that the shear pin is disposed longitudinally between the first end of the first clamp portion and the retaining member.

16. The clamp of claim 15, where the clamp is configured such that a longitudinal distance from the first end of the first clamp portion to the center of the retaining member is between 2 to 4 times a longitudinal distance from the first end of the first clamp portion to the center of the shear pin.

17. The clamp of claims 3, where at least one sidewall of the first clamp portion is configured to apply a resistive force to the second clamp portion at a point longitudinally between the first end of the second clamp portion and the shear pin if a force is applied to the second clamp portion in a first direction.

18. The clamp of claims 3, where at least one sidewall of the first clamp portion is configured to apply a resistive force to the second clamp portion at a point longitudinally between the second end of the first clamp portion and the shear pin if a force is applied to the second clamp portion in a second direction.

19. The clamp of claims 1, where a longitudinal distance from the second end of the second clamp portion to the center of the shear pin is between 1 to 4 times a longitudinal distance from the first end of the first clamp portion to the center of the shear pin.

20. A method comprising:
coupling, with a shear pin, a second clamp portion having a first end configured to be coupled to an umbilical and a second end configured to be received into a recess of a fist clamp portion having a retaining member such that:
the retaining member resists shearing of the shear pin if a force is applied to the second clamp portion in a first direction and does not resist shearing of the direction;
where, when the second clamp portion is coupled to the umbilical, the fist direction aligns with a first portion of the umbilical on a fist side of the fist end of the second clamp portion, and the second direction aligns with a second portion of the umbilical on a second side of the first end of the second clamp portion.

* * * * *